United States Patent [19]

Kamiya et al.

[11] Patent Number: 5,180,533
[45] Date of Patent: Jan. 19, 1993

[54] METHOD FOR PRODUCTION OF SINTERED CERAMIC ARTICLE CONTAINING TITANIUM DIBORIDE AND SILICON CARBIDE

[75] Inventors: Akira Kamiya, Nagoya; Kikuo Nakano, Kasugai, both of Japan

[73] Assignees: Agency of Industrial Science and Technology; Ministry of International Trade and Industry, both of Tokyo, Japan

[21] Appl. No.: 762,376

[22] Filed: Sep. 19, 1991

[30] Foreign Application Priority Data

Sep. 21, 1990 [JP] Japan .................. 2-253531

[51] Int. Cl.$^5$ .................. F27D 7/00; C04B 35/58
[52] U.S. Cl. ........................ 264/65; 301/92; 301/95; 301/96
[58] Field of Search ............ 501/92, 95, 96; 264/65

[56] References Cited

U.S. PATENT DOCUMENTS

| | | | |
|---|---|---|---|
| 5,032,242 | 7/1991 | Knudsen et al. | 501/96 |
| 5,032,550 | 7/1991 | Derkacy | 501/92 |
| 5,102,835 | 4/1992 | Saito et al. | 501/92 |
| 5,108,962 | 4/1992 | Khazai et al. | 501/96 |

FOREIGN PATENT DOCUMENTS 62-230675 10/1987 Japan .

OTHER PUBLICATIONS

Communications of the American Ceramic Society, Feb. 1985, pp. C-34 to C-36, T. Watanabe, et al., "Mechanical Properties of Hot-Pressed $TiB_2$-$ZrO_2$ Composites".

Journal of Materials Science, 25, 1990, pp. 580-584, E. S. Kang, et al., "Improvements in Mechanical Properties of $TiB_2$ by the Dispersion of $B_4C$ Particles".

"Pressureless Sintering and Mechanical Properties of $TiB_2$ with $Cr_3C_2$ additive", J. Matsushita, et al., 98(4), 1990, pp. 355-359.

"Preparation and Mechanical Properties of $TiB_2$ Composites containing Ni and C", J. Matsushita, et al., 99(1) 1991, pp. 78-82.

J. Am. Ceram. Soc., 69, [4] 1986, pp. 317-321, C. C. Sorrell, et al., "Mechanical Properties of $ZrC$-$ZrB_2$ and $ZrC$-$TiB_2$ Directionally Solidified Eutectics".

Primary Examiner—Mark L. Bell
Assistant Examiner—Deborah Jones
Attorney, Agent, or Firm—Oblon, Spivak, McClelland, Maier & Neustadt

[57] ABSTRACT

A sintered article having a matrix of titanium diboride and a dispersed reinforcing phase of silicon carbide is produced by mixing titanium diboride powder and silicon carbide powder or whiskers, combining the resultant mixture with silicon boride, and sintering the produced mixture in a non-oxidative atmosphere under a pressure of at least 300 kg/cm$_2$ at a temperature of at least 1,300°C.

10 Claims, 1 Drawing Sheet

METHOD FOR PRODUCTION OF SINTERED CERAMIC ARTICLE CONTAINING TITANIUM DIBORIDE AND SILICON CARBIDE

BACKGROUND OF THE INVENTION

1. Field of the Invention

This invention relates to a method for the production of a high-strength sintered ceramic article having titanium diboride and silicon carbide as main components thereof and more particularly to such a sintered ceramic article suitable for use as a material for valves, cocks, vessels and pipes requiring high resistance to chemicals and gases, for cutting tools, and for burners, fireproof furnace parts, furnace core tubes and other components used in high-temperature environments.

2. Prior Art Statement

Titanium diboride does not sinter easily and the sintered article thereof is low in toughness. U.S. Application Ser. No. 07/319,716 (corresponding to Japanese Patent Application SHO 63(1988)-114,399) teaches a method for overcoming these drawbacks of titanium diboride. The method consists essentially of mixing titanium diboride with silicon carbide and sintering the resultant mixture in a molded form, thereby producing a sintered composite article. The sintered composite article obtained by this method exhibits higher toughness than a sintered article of only titanium diboride. It nevertheless has an unsolved problem regarding sintering property. There is a strong need from the practical point of view of overcoming this problem.

SUMMARY OF THE INVENTION

The present inventors continued a study in search of a way for solving this problem and, as a result, achieved the present invention.

Specifically, the present invention is directed to a method for the production of a high-strength sintered ceramic article having a matrix of titanium diboride, and a dispersed reinforcing phase of silicon carbide, which method consists essentially of mixing titanium diboride powder with at least one member selected from the group consisting of silicon carbide whiskers and silicon carbide powder in an amount in the range of from 5 to 30% by volume, based on the total amount of titanium diboride and silicon carbide, combining the resultant mixture with 1 to 10% by weight, based on the amount of the resultant mixture, of silicon boride, and sintering the resultant combination in a non-oxidative atmosphere by heating at a temperature of at least 1,300° C. and pressing under a pressure of at least 300 kg/cm$^2$.

The above and other objects and features of the invention will become apparent from the following detailed description with reference to the accompanying drawings.

DESCRIPTION OF THE PREFERRED EMBODIMENTS

Figure 1:
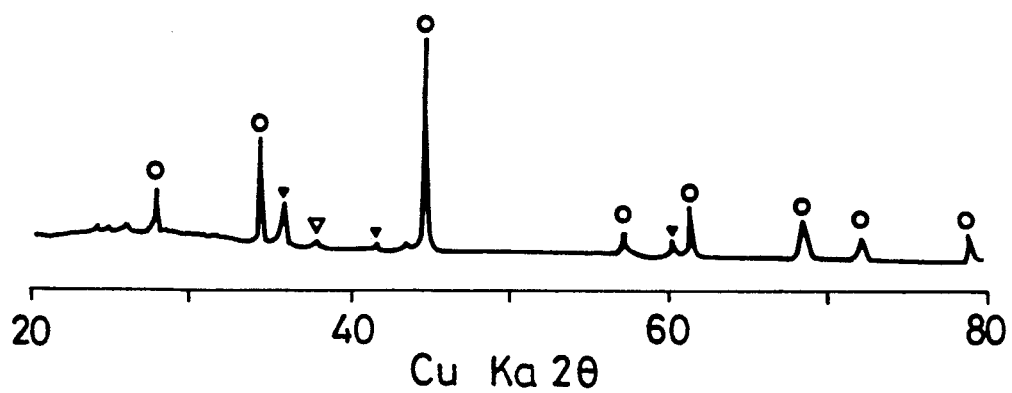
FIG. 1 is an X-ray diffraction pattern of the sintered article produced in Example 5.

The silicon boride contemplated by the present invention may be either SiB$_6$ or SiB$_4$.

The present invention causes the mixture of titanium diboride with silicon carbide to be further combined with silicon boride. The product of this combination acquires excellent sinterability and the sintered article of this product exhibits high strength. This reason for this is presumed to be that silicon boride and silicon carbide partially interreact in the process of sintering to yield boron carbide and silicon and consequently enable the product of the combination to sinter at lower temperatures and, at the same time, improve the quality of the interface between the dispersed reinforcing phase of silicon carbide and the matrix of titanium diboride.

The present invention concerns a method for the production of a sintered article by the steps of mixing titanium diboride powder with either silicon carbide whiskers or silicon carbide powder in an amount in the range of from 5 to 30% by volume, based on the total amount of titanium diboride and silicon carbide, combining the resultant mixture with 1 to 10% by weight of silicon boride (SiB$_6$ or SiB$_4$), homogeneously mixing the resultant mixture, and sintering the homogeneous mixture by application of heat and pressure.

The silicon carbide for forming the dispersed reinforcing phase is desired to contain no impurities. Specifically, it is desired to have purity of not lower than 95%. The silicon carbide whiskers have a diameter approximately in the range of from 0.1 to 1 $\mu$m and a length approximately in the range of from 10 to 100 $\mu$m. For ensuring the thorough dispersion of the silicon carbide whiskers in the titanium diboride matrix that is required to obtain a sintered article exhibiting high strength, the diameter of the whiskers is desired to be on the high side within the range specified above, specifically in the 0.5 to 1 $\mu$m part of the range, and the length to fall in the range of from 50 to 100 $\mu$m.

In the case of the silicon carbide powder, in order for the dispersibility of the powder to be fully satisfactory, the powder is required to have a smaller particle diameter than the titanium diboride for forming the matrix. Particularly, the particle diameter of this powder is desired to be not more than 1/10 of the particle diameter of the titanium diboride.

In the present invention, the silicon carbide is added to the titanium diboride in an amount calculated to account for between 5 and 30% by volume of the resulting mixture. If this amount falls short of 5% by volume, the effect of the addition of silicon carbide is not obtained, and if it exceeds 30% by volume, the sintering property tends to be poor and the sintered article brittle.

The present invention is characterized by the addition of the silicon boride. The amount of the silicon boride to be added is in the range of from 1 to 10% by weight, based on the total amount of the titanium diboride and the silicon carbide. If this amount is less than 1% by weight, the effect of the addition, namely the effect of improving the sintering property, is not attained. On the other hand, if this amount exceeds 10% by weight, various disadvantages arise such as absence of any discernible increase in the sintering property, unwanted survival of unaltered silicon boride (when the sintering temperature is low), excessive reaction of silicon carbide and silicon boride, abnormal grain growth, and whisker deformation, for example.

For the sake of the sintering property, the particle diameter of the titanium diboride is desired to be small, preferably smaller than 3 μm. The particle diameter of the silicon boride is desired to be smaller than that of the silicon carbide.

Now, the procedure for mixture of substances as raw materials will be described.

It is necessary for the raw materials to be mixed as uniformly as possible. Though the means to be used for this mixture is not particularly restricted, the mixture is attained efficiently from the practical point of view by dispersing the raw materials in an organic solvent such as, for example, ethanol and stirring the dispersion in accordance with the ultrasonic dispersion method, the ball mill method, or the vibration mill method. In this case, the dispersion of whiskers can be effectively facilitated by adding a surfactant such as a fatty acid, a higher alcohol, or an alkylsulfonic acid or by adding a suitable electrolyte for adjusting the zeta potential.

The dry homogenous mixture of raw materials which is consequently obtained is sintered by application of heat and pressure. Simultaneous application of heat and pressure must be carried out in a non-oxidative atmosphere such as of argon, nitrogen, or vacuum. For the sake of this sintering, the pressure is required to be at least 300 kg/cm$^2$, the temperature to be at least 1,300° C., and the period of heat and temperature application to be at least 30 minutes. If the application of heat and pressure is continued at an excessively high temperature for an unduly long time, whisker deterioration and abnormal grain growth occur in the matrix during the sintering operation. Thus, a temperature not exceeding 1,800° C. and a period not exceeding one hour are desirable.

Now, the present invention will be described more specifically below with reference to working examples and comparative experiments.

EXAMPLE 1

Titanium diboride of an average particle diameter of 1.3 μm, silicon carbide whiskers of an average diameter of 0.5 μm and average length of 30 μm, and $SiB_6$ of an average particle diameter of 18.5 μm were added to ethanol containing a surfactant in respective amounts of 90 vol %, 10 vol % and 5 wt % based on the total amount of titanium diboride and silicon carbide whisker and the result was blended in a ball mill for 24 hours. The liquid component was then separated from the blended mixture and the remaining solid components were dried in a vacuum at 200° C. and passed through a 60-mesh sieve. The resulting powder was sintered in an argon atmosphere by heating at 1,600° C. under a pressure of 360 kg/cm$^2$ for one hour, whereby there was obtained a sintered article.

EXAMPLE 2

A sintered article was obtained by following the procedure of Example 1, except that the application of heat and pressure in the atmosphere of argon was carried out at 1,700° C. under a pressure of 360 kg/cm$^2$ for one hour.

EXAMPLE 3

A sintered article was obtained by following the procedure of Example 1, except that the amount of the whiskers was changed to 20% by volume, based on the total amount of titanium diboride and silicon carbide whisker and the application of heat and pressure in the atmosphere of argon was carried out at 1,700° C. under a pressure of 360 kg/cm$^2$ for one hour.

EXAMPLE 4

A sintered article was obtained by following the procedure of Example 3, except that the heating of the powdered mixture in the atmosphere of argon was conducted at 1,800° C.

EXAMPLE 5

A sintered article was obtained by following the procedure of Example 1, except that the amount of the whiskers was changed to 30% by volume, based on the total amount of titanium diboride and silicon carbide whisker and the heating of the powdered mixture in the atmosphere of argon was conducted at 1,800° C.

COMPARATIVE EXPERIMENT 1

Titanium diboride powder having an average particle diameter of 1.3 μm was heated and pressed in an atmosphere of argon at 1,900° C. under a pressure of 360 kg/cm$^2$ for one hour.

COMPARATIVE EXPERIMENT 2

Titanium diboride having an average particle diameter of 1.3 μm and 5 wt % based on the titanium diboride of $SiB_6$ having an average particle diameter of 18.5 μm were added to ethanol and the result was blended in a ball mill. The liquid component was then separated from the blended mixture and the remaining solid components were dried in a vacuum at 200° C. The resulting dry powder was sintered by heating at 1,600° C. under a pressure of 360 kg/cm$^2$, whereby there was obtained a sintered article.

COMPARATIVE EXPERIMENT 3

A sintered article was obtained by following the procedure of Comparative Experiment 2, except that the heating of the powdered mixture was conducted at 1,700° C.

COMPARATIVE EXPERIMENTS 4 TO 8

Sintered articles were obtained by respectively following the procedures of Examples 1 to 5, except that the addition of $SiB_6$ was omitted.

The sintered articles obtained in the working examples and the comparative experiments described above were tested for bulk density by the Archimedean method. The relative densities of the sintered articles were found by comparing the found bulk densities with the theoretical density. The sintered articles were also tested for bending strength and fracture toughness ($K_{IC}$) at normal room temperature. The bending strength was determined by subjecting a test specimen 4 mm in height and 3 mm in width to the three-point bending test using a span of 30 mm. The fracture toughness ($K_{IC}$) was determined by subjecting a test specimen having the same size as mentioned above and containing a notch 1 mm in depth to the four-point test at a lower span of 30 mm and an upper span of 10 mm (SENB method). The results are shown in Tables 1, 2 and 3.

TABLE 1

Characteristic values found in working examples

| Example No. | Raw materials | | | Conditions of temperature and pressure | | | Relative density (%) | Bending strength (MPa) | $K_{IC}$ (MPa$\sqrt{m}$) |
|---|---|---|---|---|---|---|---|---|---|
| | $TiB_2$ (vol %) | SiC whiskers (vol %) | $SiB_6$ (wt %) | Temperature (°C.) | Pressure (kg/cm²) | Hour | | | |
| 1 | 90 | 10 | 5 | 1600 | 360 | 1 | 98.1 | 970 ± 40 | 6.0 ± 0.2 |
| 2 | 90 | 10 | 5 | 1700 | 360 | 1 | 98.6 | 1030 ± 50 | 6.2 ± 0.1 |
| 3 | 80 | 20 | 5 | 1700 | 360 | 1 | 99.0 | 750 ± 60 | 6.2 ± 0.03 |
| 4 | 80 | 20 | 5 | 1800 | 360 | 1 | 99.3 | 800 ± 100 | 6.1 ± 0.1 |
| 5 | 70 | 30 | 5 | 1800 | 360 | 1 | 99.0 | 730 ± 50 | 6.0 ± 0.03 |

TABLE 2

Characteristic values found in comparative experiments 1 to 3

| Comparative Experiment No. | Raw materials | | Conditions of temperature and pressure | | | Relative density (%) | Bending strength (MPa) | $K_{IC}$ (MPa$\sqrt{m}$) |
|---|---|---|---|---|---|---|---|---|
| | $TiB_2$ (vol %) | $SiB_6$ (wt %) | Temperature (°C.) | Pressure (kg/cm²) | Hour | | | |
| 1 | 100 | 0 | 1900 | 360 | 1 | 97.3 | 480 ± 40 | 6.0 ± 0.2 |
| 2 | 100 | 5 | 1600 | 360 | 1 | 97.5 | 660 ± 60 | 5.0 ± 0.2 |
| 3 | 100 | 5 | 1700 | 360 | 1 | 98.6 | 700 ± 60 | 5.0 ± 0.2 |

TABLE 3

Characteristic values found in comparative experiments 4 to 8

| Comparative Experiment No. | Raw materials | | Conditions of temperature and pressure | | | Relative density (%) | Bending strength (MPa) | $K_{IC}$ (MPa$\sqrt{m}$) |
|---|---|---|---|---|---|---|---|---|
| | $TiB_2$ (vol %) | SiC whiskers (vol %) | Temperature (°C.) | Pressure (kg/cm²) | Hour | | | |
| 4 | 90 | 10 | 1600 | 360 | 1 | 95.2 | 530 ± 40 | 5.3 ± 0.2 |
| 5 | 90 | 10 | 1700 | 360 | 1 | 97.5 | 800 ± 20 | 6.0 ± 0.3 |
| 6 | 80 | 20 | 1700 | 360 | 1 | 94.1 | 570 ± 50 | 5.5 ± 0.1 |
| 7 | 80 | 20 | 1800 | 360 | 1 | 98.3 | 740 ± 20 | 6.0 ± 0.2 |
| 8 | 70 | 30 | 1800 | 360 | 1 | 96.6 | 540 ± 20 | 5.2 ± 0.2 |

Tables 1 and 2 clearly show that the sintered articles of mixtures of titanium diboride and silicon carbide plus silicon boride showed higher degrees of strength than those solely of titanium diboride or a mixture of titanium diboride and silicon boride.

Moreover, Tables 1 and 3 show that the sintered articles of mixtures of titanium diboride, SiC and $SiB_6$ exhibited notably enhanced strength as compared with those of mixtures of titanium diboride and SiC.

Japanese Patent Application SHO 63(1988)-114399 mentioned above discloses that a sintered article obtained by mixing 10% silicon carbide with titanium diboride and heating the result in an atmosphere of argon at 1,900° C. for 1.5 hours under a pressure of 370 kg/cm², i.e. a sintered article containing no silicon boride, exhibited a relative density of 96.6%, a bending strength of 753±30 MPa, and a fracture toughness ($K_{IC}$) of 6.12±0.01 MPa$\sqrt{m}$.

Figure 2:
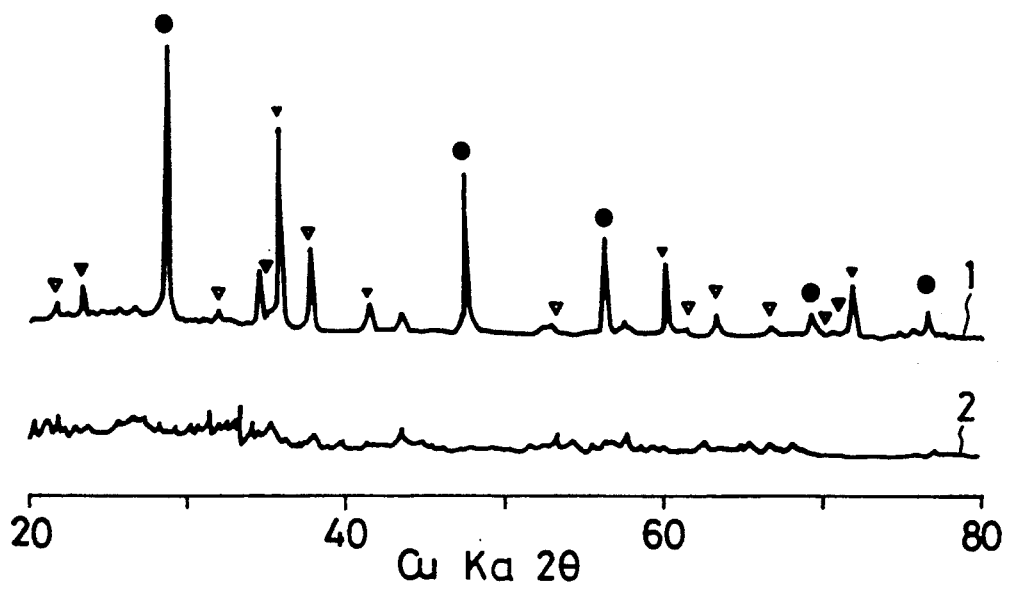
FIG. 2 shows the X-ray diffraction pattern of a sintered article obtained by mixing SiB$_6$ with 30% by volume of silicon carbide and sintering the resultant mixture and that of a sintered article produced solely of SiB$_6$.

The sintered article produced by the method of this invention was found by powder X-ray diffraction to contain boron carbide. The X-ray diffraction pattern of the sintered article produced in the experiment of Example 5 is shown in FIG. 1. For the purpose of comparison, the powder X-ray diffraction pattern of a sintered article obtained by following the procedure of Example 5, except for use of a mixture of $SiB_6$ and silicon carbide added in an amount of 30%, and that solely of $SiB_6$ are shown by lines 1, 2 in FIG. 2. In the diagram, ○ represents $TiB_2$ values, ●Si values,  SiC values, and ∇$B_4C$ values. In the curve 1 of FIG. 2, peaks of silicon are seen in addition to peaks of boron carbide, suggesting that the following reaction occurred between silicon boride ($SiB_6$) and silicon carbide during the sintering:

$$2SiB_6 + 3SiC \rightarrow 3B_4C + 5Si$$

Owing to the occurrence of this reaction during the sintering, the sintering was able to proceed at a lower temperature and the sintered article enjoyed improvement in strength.

In the production of a sintered article with a powder having titanium diboride and silicon carbide as main components thereof, the present invention enhances the sintering property of the mixture and enables the produced sintered article to acquire improved strength as compared with the sintered article obtained by the conventional method.

The manufacture of ceramics having a matrix of titanium diboride, an ideal material for various parts requiring high resistance to chemicals, cutting tools and mechanical devices exposed to high temperatures, and silicon carbide as a dispersed reinforcing phase can be realized by the present invention.

What is claimed is:

1. A method for the production of a high-strength sintered ceramic article having a matrix of titanium diboride and a dispersed reinforcing phase of silicon carbide and containing boron carbide and silicon, by heating and pressing, which method consists essentially of mixing titanium diboride powder and at least one silicon carbide selected from the group consisting of silicon carbide whiskers and silicon carbide powder in an amount in the range of from 5 to 30% by volume, based on the total amount of titanium diboride and silicon carbide, combining the resultant mixture with 1 to 10% by weight, based on the amount of said resultant mixture, of silicon boride and sintering the resultant combination in a non-oxidative atmosphere under a pressure of at least 300 kg/cm² at a temperature of at least 1,300° C.

2. A method according to claim 1, wherein said silicon carbide whiskers have an average particle diameter in the range of from 0.1 to 1 μm and an average length in the range of from 10 to 100 μm.

3. A method according to claim 2, wherein the average particle diameter of said silicon carbide whiskers is in the range of from 0.5 to 1 μm and the average length thereof is in the range of from 50 to 100 μm.

4. A method according to claim 1, wherein said titanium diboride powder has a maximum particle diameter of 3 μm.

5. A method according to claim 1, wherein the particle diameter of said silicon carbide powder is smaller than that of titanium diboride powder.

6. A method according to claim 5, wherein the particle diameter of said silicon carbide powder is not more than 1/10 of that of said titanium diboride powder.

7. A method according to claim 1, wherein the particle diameter of said silicon boride is smaller than that of said silicon carbide.

8. A method according to claim 1, wherein said resultant combination is homogenized before sintering.

9. A method according to claim 1, wherein the mixing and combining are carried out in an organic solvent.

10. A method according to claim 1, wherein the mixing and combining are carried out in an organic solvent including at least one member selected from the group consisting of surfactants and electrolytes.

* * * * *